Figure 1:
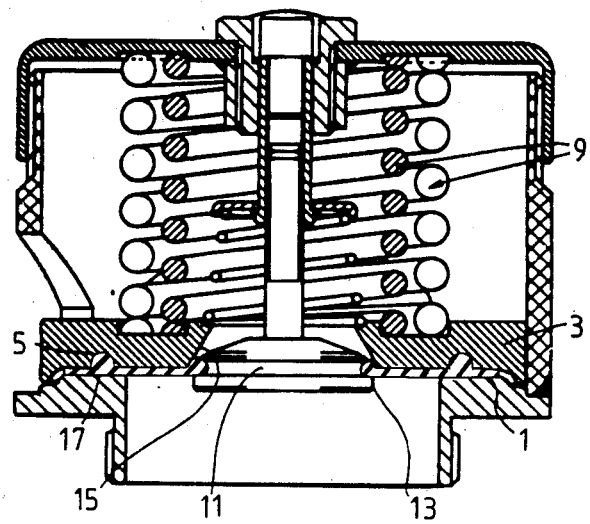

United States Patent [19]

Fort

[11] Patent Number: 4,691,734
[45] Date of Patent: Sep. 8, 1987

[54] VALVE SEALS

[75] Inventor: Edward S. Fort, Clitheroe, England

[73] Assignee: Fort Vale Engineering Ltd., Nelson, England

[21] Appl. No.: 845,972

[22] Filed: Mar. 28, 1986

[30] Foreign Application Priority Data

May 21, 1985 [GB] United Kingdom ............... 8512829

[51] Int. Cl.[4] ............... F16K 17/196; F16K 1/44
[52] U.S. Cl. ............... 137/493.4; 137/493.6; 137/495; 251/365; 251/900
[58] Field of Search ............... 251/359, 365, 332, 900, 251/357; 137/493.6, 494, 493.1, 493.2, 493.3, 493.4, 495

[56] References Cited

U.S. PATENT DOCUMENTS

| | | | |
|---|---|---|---|
| 1,707,017 | 3/1929 | Kibele | 251/357 X |
| 3,199,833 | 8/1965 | Skinner | 251/357 X |
| 3,327,991 | 6/1967 | Wallace | 251/332 X |
| 3,612,479 | 10/1971 | Smith | 251/900 X |
| 3,809,362 | 5/1974 | Baumann | 251/332 |
| 3,881,507 | 5/1975 | Stump | 137/493.4 |
| 3,971,406 | 7/1976 | Inada et al. | 137/493.4 |

Primary Examiner—Martin P. Schwadron
Assistant Examiner—Stephen M. Hepperle
Attorney, Agent, or Firm—John S. Hale

[57] ABSTRACT

A pressure relief valve adapted in use to relieve excess pressure within a vessel. The valve comprises a valve seat (20) and a moveable valve member (28) which is resiliently biased towards the valve seat (20) by coil springs (30) to maintain the valve in a normally closed position. A valve seal (52) is carried by the moveable valve member (28), between the moveable valve member (28) and the valve seat (20), to seal the gap therebetween when the valve is closed. The valve seal (52) has an annular pressure sealing face (54) which in the valves normally closed position sealingly co-operates with the valve seat (20). A resilient biasing member (58) is disposed behind the annular pressure sealing face (54) so that in the valves normally closed position, the annular pressure sealing face (54) is maintained in sealing contact with the valve seat (20) formed integrally with the annular pressure sealing face (54) and disposed radially inward thereof, locating means (80) locate the valve seal (52) on the moveable valve member (28).

11 Claims, 3 Drawing Figures

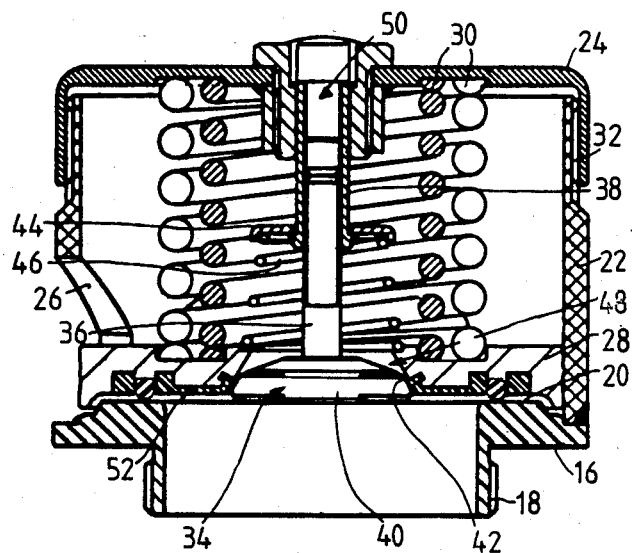
F I G.2

VALVE SEALS

DESCRIPTION

The present invention relates to a valve seal for a pressure relief valve and in particular to a combined pressure and vacuum relief valve.

A known pressure and vacuum relief valve is illustrated in FIG. 1 of the accompanying drawings. It comprises a valve seat 1 with which a movable valve member 3 is engageable. The valve member 3 has an annular recess 5 which receives a pressure seal 17 which is in the form of an O-ring seal. The O-ring seal may have a coating of Polytetrafluroethylene. The valve member 3 is resiliently biased into contact with the valve seat 1 by springs 9. A vacuum pressure valve is also provided in the form of a poppet valve 11 which carries an O-ring seal 13. The O-ring seal is co-operable with a vacuum valve seat 15 with the poppet valve resiliently biased into the closed position. The two O-ring seals 17,13 are machined and/or lapped to give efficient sealing contact with the respective mating faces.

The described valve serves to relieve excess pressure and to prevent a vacuum forming in the container to which the valve is fitted in use. The construction of the pressure valve seal arrangement is especially critical since it has to withstand pressures of up to 120 p.s.i. (8.4 bar) and flow rates of up to 12,000 c.f.m. (340,000 liters/sec.)

In order to try and positively locate the O-ring seal in the seal groove, the walls of the seal groove have been angled outwardly so that the inner wall of the groove at the edge is arranged to extend radially outwardly. The amount of angling is limited by the need to prevent blow out of the seal during a pressure relieving operation. The above described valve has proved to be reasonably satisfactory in both respects, however the aim of the present invention is to provide an improved seal arrangement with regard to blow out prevention, availability, initial and spares cost reduction, and to make servicing much more easy and successful.

According to the present invention there is provided a valve seal for a pressure relief valve comprising an annular seal member having an annular pressure sealing face which is backed up by a resilient member, and locating means comprising an anchoring lug formed integrally with the annular pressure sealing face and disposed radially inwardly thereof.

In use, the valve seal is to be carried by a movable valve member, and a locating member is co-operable with the anchoring lug so that under conditions of pressure relief, the annular seal member is physically held in contact with the valve member so that blow out of the pressure seal is avoided. Where the relief valve is solely a pressure relief valve, the locating member may take the form of a clamping plate which engages with the anchoring lug and/or an extension of the locating means formed integrally with the annular pressure sealing face. Where the relief valve is a pressure and vacuum relief valve, the locating member may comprise the vacuum relief valve member. In the latter case the anchoring lug may comprise an annular vacuum sealing face and a radially outwardly directed lip disposed adjacent thereto. Thus, the annular seal member has an inner edge which is turned over on itself to form a radially outwardly directed groove.

The annular seal member preferably has a radially outer portion which is provided with an annular groove to receive the resilient backing member. The resilient backing member may take the form of a silicone rubber O-ring or a resilient, coated, stainless steel ring. The annular seal member itself is preferably made of polytetrafluroethylene. It may be machined into the desired shape or made by moulding. The annular groove in the annular seal member defines two concentric annular rims which are arranged to be received in concentric annular recesses in the valve member. The outer periphery of the annular seal member is adapted to abut a shoulder of the valve member. The annular groove has an end wall which is arcuate when viewed in cross-section and of a thickness which imparts the desired flexibility to the pressure sealing face formed by this section of the annular sealing member. The curvature of this inner end wall and that of the outer arcuate pressure sealing face may be different such that the wall thickness is greater on the centre line of the groove to allow for lapping of the pressure sealing face. The thickness of the annular sealing member in the region of the pressure sealing face is approximately half that of the annular section linking the anchoring lug to the outer portion accommodating the resilient backing member.

In the preferred embodiment of the invention then there is provided a valve seal for a valve member of a pressure and vacuum relief valve which comprises an annular seal member having an annular pressure sealing face for engagement with a pressure valve seat and, radially inwardly thereof, an annular vacuum sealing face for engagement with a vacuum pressure seat, with at least the annular pressure sealing face being backed up by a resilient member which is received in an annular groove in the annular seal member, the annular seal member having locating means which is engageable with the valve member, which locating means comprises a radially outwardly directed lug which is disposed radially inwardly of the annular pressure sealing face and adjacent the vacuum sealing face.

In the preferred embodiment, the vacuum valve member engages with the vacuum sealing face of the annular seal member so that it is held in position on the pressure relief valve member under the influence of pressure in the vessel to which the valve is secured.

According to another aspect of the present invention there is provided a pressure relief valve comprising a valve seat and a movable valve member which is resiliently biased towards the valve seat, and having a valve seal carried by the movable valve member and comprising an annular sealing member having an annular pressure sealing face which is co-operable with the valve seat and which is backed up by a resilient member, and locating means comprising an anchoring lug formed integrally with the annular pressure sealing face and disposed radially inwardly thereof and engageable by a locating member.

In a preferred embodiment, the pressure relief valve is designed to relieve positive and negative pressures, and for the latter purpose a vacuum pressure valve member is carried by the movable valve member and resiliently biased to close an orifice therein. The vacuum pressure valve member serves as the locating member for the annular sealing member and co-operates with a vacuum pressure sealing face of the annular member. This vacuum pressure sealing face is disposed adjacent to a radially outwardly turned lip which forms part of the anchor member. Positive pressure in the vessel with which the relief valve is connected urges the vacuum valve member into contact with the vacuum pressure sealing face—so ensuring that the annular sealing member is anchored in position and thus blow out of the annular pressure seal is avoided.

Figure 3:
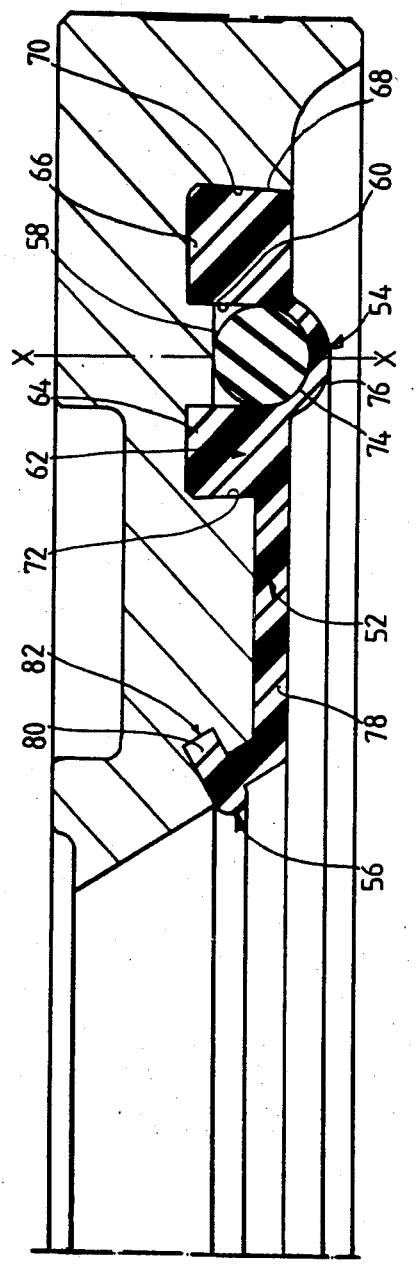

The present invention will now be described further, by way of example only, with reference to the accompanying drawings of FIGS. 2 and 3. In the drawings, FIG. 1 is a sectional view of a prior art pressure and vacuum relief valve;

FIG. 2 is a sectional view of a pressure and vacuum relief valve having the improved valve seal of the present invention; and FIG. 3 is a sectional view drawn to a larger scale of one half of the movable valve member and the valve seal shown in FIG. 2.

Referring firstly to the drawing of FIG. 2 there is shown a pressure and vacuum relief valve, i.e. a relief valve for both positive and negative pressure. The valve comprises a valve seat member 16 which has a threaded neck 18 to enable the valve to be fitted to any desired vessel. The valve seat member has an annular valve seat 20 with an outer periphery which is stepped downwardly. A valve housing is formed on the valve seat member 16 by a sleeve 22 welded thereto, and a cap 24 which engages screw threadedly with the sleeve. The sleeve has a plurality of apertures 26 therein which serve as pressure relief orifices. Guided on the inner wall of the sleeve 22 is a movable valve member 28. This is biased towards the valve seat 20 by coil springs 30 which take their abutment on the valve member and the underside of the cap 24. The positive relief pressure is determined by the stress in these springs. A fine adjustment can be effected by rotating the cap relative to the sleeve by virtue of the threaded section 32.

The valve also comprises a vacuum valve member in the form of a poppet valve 34 for relieving negative pressure. The vacuum valve member has a stem 36 which is guided for sliding movement in a guide tube 38, and a head 40 having a conical valve seat 42. The guide tube carries an abutment plate 44 for a coil spring 46 whose other end abuts the valve member 28. The head 40 of the valve member 34 is thus urged in a direction to close off an orifice 48 in the valve member 28. Adjustment means 50 is provided to set the negative pressure at which the vacuum relief valve operates. It will be appreciated that the described guide arrangement and the use of a conical head may be replaced by alternative arrangements.

In order to seal the respective valve seats and faces of the positive and negative pressure valves, a valve seal 52 is employed. This valve seal and the valve member 28 on which it is mounted are shown in greater detail in FIG. 3. The valve seal comprises an annular member, which in the illustrated embodiment, has two sealing faces, one for the positive pressure relief valve, herein referred to as the pressure sealing face 54, and one for the negative pressure relief valve, herein referred to as the vacuum sealing face 56. Both sealing faces are annular. The annular vacuum sealing face 56 is disposed radially inwardly of the annular pressure sealing face 54 but is formed integrally therewith. The annular seal member is preferably formed from polytetrafluroethylene (PTFE) by machining from a solid. Alternatively, it may be formed by moulding.

The pressure sealing face 54 is backed up by a resilient member 58 which is preferably a silicon rubber O-ring seal. However, any alternative resilient member may be employed—for example a stainless steel spirally wound ring would be suitable. The resilient member 58 is accommodated within an annular groove 60 formed in an outer portion 62 of the annular seal member. This outer portion has two concentric annular rims 64,66 which are adapted to be received in respective grooves in the valve member 28. The radially outer edge 68 of the rim 66 abuts against a shoulder 70 formed in the valve member. The radially inner edge of the portion 62 abuts against a shoulder 72. The groove 60 has an end wall 74 which is arcuate when viewed in cross-section, and, more specifically—semi-circular, so that the O-ring seal 58 is a snug fit therein. The pressure sealing face 54 is formed by a surface 76 which is also arcuate when viewed in cross-section and is located axially of the end wall 74. The thickness of the pressure sealing face is determined by the distance between the surfaces 74 and 76 and is such as to give the desired flexibility and sealing resilience. As manufactured, the thickness in the axial direction is greater on the centre line XX to allow for lapping of the surface 76 to form a better seal with the valve seat 20.

The vacuum sealing face 56 has an arcuate surface and is linked to the pressure sealing surface 54 in the outer portion 62 of the annular seal by a substantially planar annular portion 78. Location means is provided to locate the annular seal on the valve member 28 and this includes an anchoring lug. In the illustrated embodiment the anchoring lug comprises a radially outwardly turned lip 80 located adjacent the inner annular edge of the annular seal member. The lip 80 engages in an annular groove 82 in the valve member 28. This lip together with the snug fit of the rims 64 and 66 in respective grooves ensures that the annular valve member is held on the valve member. It will be seen that the conical valve seat 42 of the vacuum valve member 34 is engageable with the vacuum sealing face 56 either under spring action or when the valve is subject to positive pressure and thus this valve member also serves to ensure location of the annular seal member. Thus, the sealing face 56 and the lip 80 in conjunction with the co-operating surfaces act as location means. By linking the pressure sealing face 54 and the vacuum sealing face 56 in this way the likelihood of blow out is considerably reduced and quite possibly eliminated because when the valve is subject to positive pressure, the vacuum valve member 34 is urged into contact with the sealing face 56 and thus urges the lip 80 into engagement with the groove 82 in the valve member 28. Any tendency for the pressure sealing face 54 and the outer portion of the seal member to move outwardly under the action of flow and pressure during the relief operation is resisted by tension forces which would be set up in the annular portion 78.

Thus, the valve seal according to the invention resists blow out by virtue of it having location means disposed radially inwardly from the pressure sealing face which acts to positively locate the seal when it is subject to pressure forces such as during positive pressure relief. The seal also has the advantage that it makes servicing of the valve to which it is fitted simpler as less skill is required to assemble it in position. The valve seal is a simple clip fit and no special tools are required as is the case with the prior art arrangement. Furthermore, in the prior art valve, the O-ring on the vacuum poppet has to be machined to a point after fitting on the poppet to ensure satisfactory sealing. The present invention eliminates this and so makes replacement in service simpler.

The valve seal has been described above with reference to its application on a pressure and vacuum relief valve. The same principles may be employed in a seal for a simple pressure relief valve—ie. one without negative pressure relief. The negative pressure relief valve mechanism described above is dispensed with and in order to ensure positive location of the seal member, it is proposed to replace the valve head 40 by a clamping plate which is secured to the movable valve member. Preferably, the valve seal employs a similarly shaped anchoring lug having a radially outwardly turned lip and an annular sealing face which is engaged by the clamping plate. It is convenient if the clamping plate is secured from the rear face of the valve member by screws engaging in threaded blind holes in the clamping plate, so that the annular sealing face serves to seal off the orifice in the movable valve member. Thus, with the clamping plate secured in position, the annular seal member is held positively in position and blow out is prevented.

Relief valves of this type as used on container tanks are required to pass a positive pressure gas tightness test and the use of PTFE with a resilient backing has been found to be successful. The valve seal of the present invention aims to reproduce the sealing qualities of the prior art O-ring seal whilst providing improved blow out resistance and simpler assembly.

In certain circumstances it may be desirable to provide the vacuum sealing face with a resilient back up member in a similar manner to that utilised for the pressure seal, but generally this is not necessary because the pressure forces acting on the vacuum valve member are generally sufficient to achieve a satisfactory seal with a PTFE face as described above.

I claim:

1. A pressure relief valve adapted in use to relieve excess pressure within a vessel, comprising a valve sea, a movable valve member resiliently biased towards the valve seat to maintain the pressure relief valve in a normally closed condition, and a valve seal carried by the movable valve member and disposed between the movable valve member and the valve seat, in which the valve seal comprises an annular valve seal member having on one side an annular pressure sealing face which in the normally closed position of the movable valve member sealingly cooperates with the valve seat and on its other side two concentric annular rims which define between them an annular groove opposite said annular pressure sealing face, said concentric annular rims being received in corresponding concentric annular recesses in the movable valve member, locating means formed integrally of the annular seal member and disposed radially inwardly of the annular pressure sealing face for locating the annular seal member on the movable valve member, and includes a resilient biasing member received in said annular groove and acting between the movable valve member and the annular seal member to maintain the annular pressure sealing face in sealing contact with the valve seat when the movable valve member is in said normally closing position.

2. A pressure relief valve according to claim 1, in which said annular pressure sealing face and said groove are arcuate in cross section, and the radius of curvature of the arcuate sealing face differs from the radius of curvature of said groove such that the arcuate wall thickness between the sealing face and the groove is greatest in the region of the center of curvature of the groove.

3. A pressure relief valve according to claim 1, wherein the locating means comprises an anchoring lug which is received in a corresponding groove in the moveable valve member.

4. A pressure relief valve according to claim 1, wherein securing means are provided to secure the annular seal member against the valve member so that in use, blow out of the annular seal member is avoided.

5. A pressure relief valve according to claim 4, wherein the securing means comprises a clamping plate which engages with the locating means and/or an extension of the locating means.

6. A pressure relief valve according to claim 4, wherein the pressure relief valve further comprises a vacuum pressure relief valve adapted in use to relieve vacuum pressure within a vessel, which vacuum pressure relief valve comprises a vacuum pressure relief valve member which is resiliently biased to close an orifice in the moveable valve member to maintain the vacuum pressure relief valve in a normally closed position, and against a surface of the annular seal member to provide said securing means.

7. A pressure relief valve according to claim 6, wherein the surface of the annular seal member against which the vacuum pressure relief valve member engages comprises a vacuum pressure sealing face.

8. A pressure relief valve according to claim 7, wherein the vacuum pressure sealing face comprises a radially outwardly turned lip which forms part of the locating means.

9. A valve seal according to claim 1, wherein the thickness of the annular sealing member in the region of the annular pressure sealing face is approximately half that of the annular section linking the locating means to the portion accommodating the resilient biasing member.

10. A valve seal for a valve member of a pressure and vacuum relief valve which comprises an annular seal member having an annular pressure sealing face for engagement with a pressure valve seat and, radially inwardly thereof, an annular vacuum sealing face for engagement with a vacuum pressure seat, with at least the annular pressure sealing face being backed up by a resilient member which is received in an annular groove in the annular seal member, the annular seal member having locating means which is engageable with the valve member, which locating means comprises a radially outwardly directed lug which is disposed radially inwardly of the annular pressure sealing face and adjacent the vacuum sealing face.

11. A valve seal according to claim 10 wherein the vacuum valve member engages in use with the vacuum sealing face of the annular seal member so that it is held in position on the pressure relief valve member under the influence of pressure in the vessel to which the valve is secured.

* * * * *